DIRECT CURRENT RESTORATION CIRCUIT FOR TELEVISION

Filed Oct. 22, 1948 2 Sheets-Sheet 1

Inventor:
John W. Downie,
by Merton D. Morse
His Attorney.

July 18, 1950 J. W. DOWNIE 2,515,763

DIRECT CURRENT RESTORATION CIRCUIT FOR TELEVISION

Filed Oct. 22, 1948 2 Sheets-Sheet 2

Inventor:
John W. Downie,
by Merton D. Moore
His Attorney.

Patented July 18, 1950

2,515,763

UNITED STATES PATENT OFFICE 2,515,763

DIRECT CURRENT RESTORATION CIRCUIT FOR TELEVISION

John W. Downie, Syracuse, N. Y., assignor to General Electric Company, a corporation of New York Application October 22, 1948, Serial No. 55,895

5 Claims. (Cl. 178—7.3)

This invention relates generally to television apparatus and more particularly, to circuits for reinserting, at the output of a video amplifier, low frequency and direct current components of a televised signal which have been attenuated or lost during transmission through an amplifier.

Present day television practice in the United States usually comprises scanning the image to be televised in a series of horizontal lines from top to bottom of the image, and repeating this whole scanning process a definite number of times per second. The signals which are transmitted must, in general, convey information relative to the brightness of the picture elements and also must convey signals of a type which will permit reproduction of picture elements in the same dimensional relation at the receiver so as to reconstitute the image, in addition to conveying information to be used in portraying the relative brightness of the picture elements as determined by the details of the image, the signals must also convey the average absolute brightness of the picture as determined by the background illumination. The average absolute brightness of the picture, or its brightness over an extended period of time with reference to a number of complete scans of the image, will be conveyed by a direct current component of the video signal and also by low frequency components. All these components must be present in the final signals utilized to reproduce the image in the receiving apparatus if distortion is to be avoided.

It is generally uneconomical to build amplifiers capable of amplifying all frequencies down to direct current over the range required in the video signal. The more common practice, in television transmitting and receiving apparatus, is to use resistance-capacitance-coupled amplifiers. Thereafter low frequency and direct current components which have been attenuated or lost in transmission are reinserted by means of circuits commonly known as direct current restorers.

As is well known in the art, restorers for television circuits commonly operate on the principle of referring all components in the video signal to some arbitrary level which is held constant at the transmitter. This level is usually established by the tips of the horizontal and vertical synchronizing pulses used to maintain the horizontal and vertical scanning at the receiver in synchronism with that at the transmitter. A restorer usually comprises a resistance-capacitance network which is provided with a shorter time constant when charging than when discharging, and which is responsive to the wave form of the synchronizing pulses acting upon it. As is well known in the art, the horizontal synchronizing pulses are interrupted a number of times per second to make way for the vertical synchronizing pulses which have the same amplitude as the horizontal synchronizing pulses but a much longer time duration. As a result, the level established by the conventional restorer will be shifted during the vertical pulses and this will cause difficulties in the operation of the sweep circuits.

It is an object of the present invention to provide an improved circuit for increasing the ability of a direct current restorer to compensate for a rapid change in the waveform of a received signal.

Another object of the present invention is to provide an improved circuit, to be used in conjunction with a direct current restorer in a television amplifier, which will correct for the shift in the level established by the restorer which would otherwise occur during the vertical synchronizing pulses.

A further object of the present invention is to provide an improved direct current restorer circuit for a television signal amplifier which includes means to vary the load impedance of the amplifier when the wave form changes so as to stabilize the reference level.

For additional objects and advantages, and for a better understanding of the invention, attention is now directed to the following description and accompanying drawings, and also to the appended claims in which the features of the invention believed to be novel are particularly pointed out.

In the drawings.

Corresponding elements in the several figures of the drawings have been designated by corresponding reference symbols for clarity.

Figures 1A, 2A, 3A:
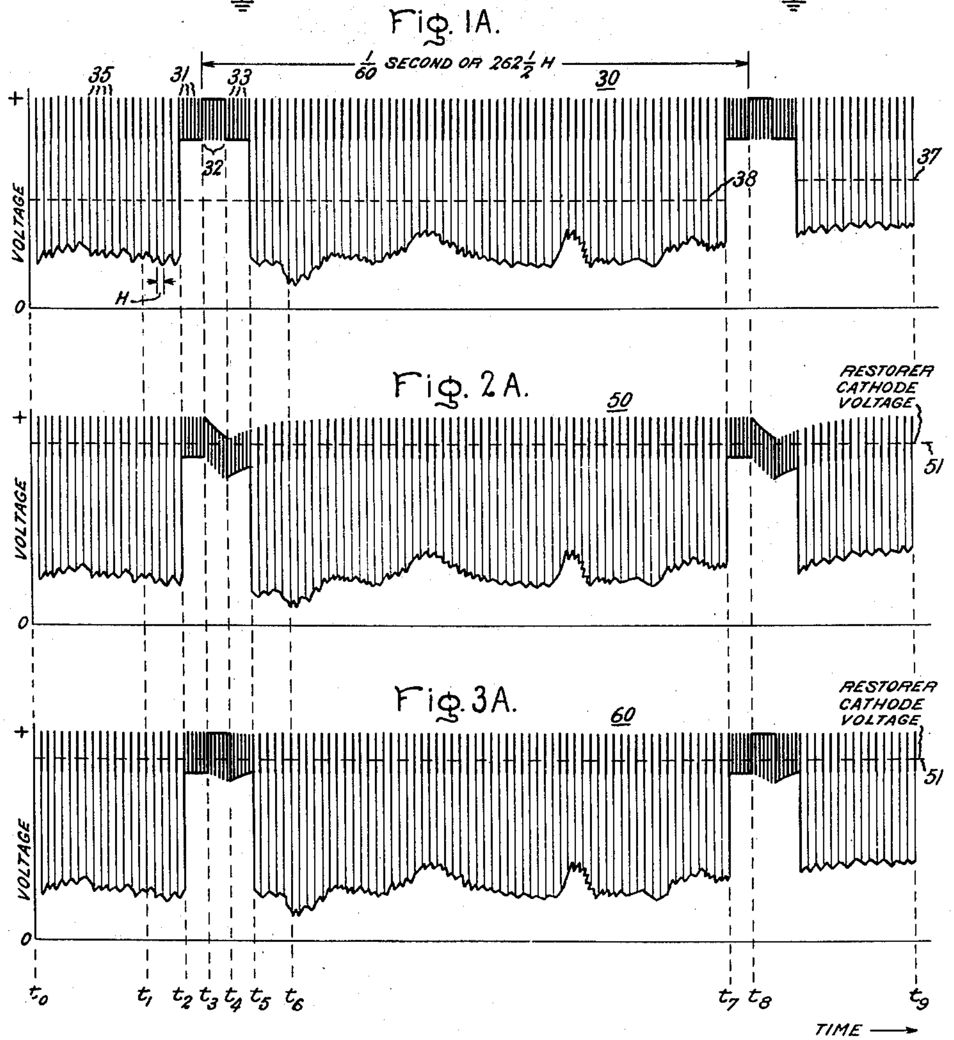
Figs. 1A, 2A and 3A are graphical representations of television picture signal waves, on a common time scale, which will be referred to in analyzing the principles underlying the invention.
Figures 1B, 2B, 3B:
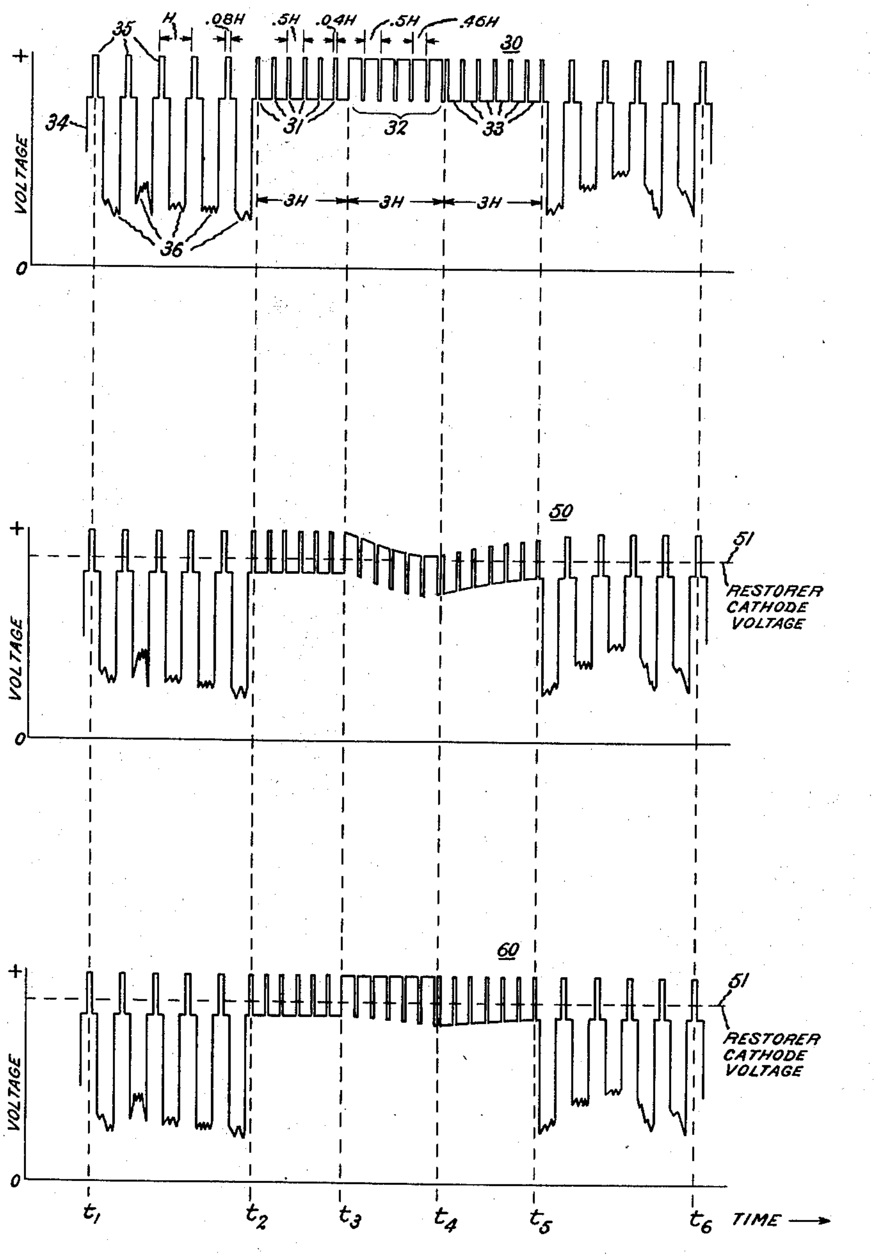
Figs. 1B, 2B and 3B are graphical representations of corresponding portions of the waves of Figs. 1A, 2A and 3A, respectively, on a common time scale which has been considerably expanded for a clearer showing of certain details of the waveforms during the time interval $t_1$—$t_6$.

Referring to Fig. 1A, there is shown a continuous curve 30 comprising two distinct signals: a video signal whose negative limits are determined in accordance with the relative brightness of the picture elements, and a synchronizing signal consisting of pulses whose positive limits are maintained at a constant level. This is more clearly illustrated in Fig. 1B, showing an expanded section of the curve 30 of Fig. 1A from time $t_1$ to time $t_6$. The actual video signal is illustrated by the negative excursions 36 occurring between the blanking pedestals 34. Superimposed on the blanking pedestals are the usual horizontal synchronizing pulses 35. In the standard television signal employed in the United States, the upper limit of the pedestals is the voltage which produces a "black image" on the receiver indicator, and the horizontal synchronizing pulses extend into the infra-black, or "blacker-than-black," voltage region. In the case of the standard 525-line picture, the horizontal synchronizing pulses occur at a rate of 15,750 pulses per second, so that the interval between them, represented by H, is $^1/_{15750}$ second. The horizontal synchronizing pulses and the picture signal are interrupted at the frame repetition frequency of 60 cycles per second to make way for the vertical synchronizing pulses. Each vertical synchronizing pulse consists of a long pulse, of duration approximately to 3 H, and of the same amplitude as the horizontal synchronizing pulses, as illustrated by section 32 of curve 30, occurring from time $t_3$ to time $t_4$. In Fig. 1A, curve 30 illustrates a complete television signal from a time $t_0$ occurring shortly before a vertical synchronizing pulse to a time $t_9$ occurring shortly after a second vertical synchronizing pulse beginning at a time $t_8$.

As is well known in the art, equalizing pulses 31 and 33 are transmitted during the interval between successive picture fields preceding and following the vertical synchronizing pulse 32, from time $t_2$ to time $t_3$, and from time $t_4$ to time $t_5$. Their function is to remove all influence of the unequal time intervals existing between the horizontal and vertical synchronizing pulses in alternate picture fields when interlaced scanning is employed.

The long vertical synchronizing pulses 32 are also conventionally serrated at the frequency of the equalizing pulses, so that synchronization of the horizontal deflection circuits may be maintained during the vertical synchronizing period. As a result, the vertical synchronizing pulse actually consists of a series of six relatively broad rectangular pulses with intervals between them of the width of one of the equalizing pulses.

According to presently accepted standards, the duration of a horizontal synchronizing pulse is .08 H, that of the equalizing pulses is .04 H, while that of the rectangular pulses constituting the vertical synchronizing pulse is .46 H. There are six equalizing pulses occurring over a period of 3 H both before and after the six broad rectangular pulses constituting the vertical synchronizing pulse. However, it will be understood that these values and the illustrated waveforms are for purposes of illustration only, and the invention is not limited thereto.

Figure 4:
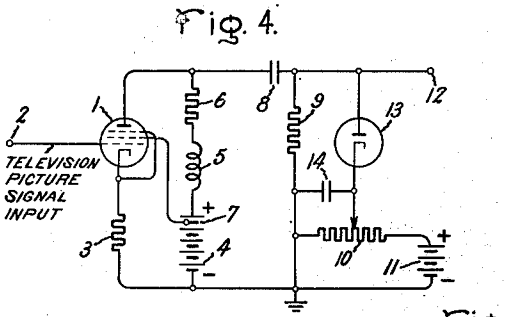
Fig. 4 is a circuit diagram of a known form of direct current restorer.

Referring to Fig. 4, there is shown a video amplifier incorporating a direct current restorer circuit known to the art. This comprises a pentode valve 1 having an input terminal 2 and an anode load impedance comprising a resistance 6 and an inductance 5 in series. Operating potential is supplied to the anode by a suitable source, represented as a battery 4, which also energizes the screen grid from a tap 7. A cathode degeneration resistor 3 has for function the improvement in linearity of the frequency response. The output signal is coupled, by means of a capacitance 8, from the intermediate point provided by the anode of valve 1, to an output terminal 12, and occurs between it and a common point indicated as ground.

A resistance-capacitance-coupled amplifier of this type will attenuate low frequency components and will not pass a unidirectional component. Accordingly, if a wave such as that represented by curve 30 of Fig. 1 is supplied to the input terminal 2, the output will be distorted in that the alternating components will be disposed about an electrical alternating current axis in such a manner that the area of the voltage-time curve above the axis is equal to the area below it. For example, referring to curve 30 of Fig. 1A, up to time $t_7$ the alternating current axis is represented by line 38. Assuming that after time $t_7$ the average illumination of the image decreases, the axis would be as represented by line 37. If the voltage represented by curve 30 were supplied to the input terminal 2, the output at terminal 12, in the absence of a direct current restorer, would consist of the same wave reversed in polarity and centered about an axis which would slowly shift from line 38 to line 37. The output of the amplifier would then be distorted, in that the decrease of signal voltage, represented by the negative displacement of the picture voltage from the axis 37 would be less than the actual equivalent decrease in picture brightness. Moreover the synchronizing pulses would not extend to the same level at all times and might fail to control the deflection circuits.

To correct this condition, a direct current restorer is provided in the output of the amplifier. Referring to Fig. 4, the conventional form of restorer illustrated comprises a diode valve 13 having its anode connected to the output terminal 12, and its cathode connected to a source of filtered bias potential provided by a suitable source, such as the battery 11, potentiometer 10 and filtering capacitance 14. A resistance 9 is provided in parallel with the diode valve as a discharge path for the voltage accumulated across the capacitor 8. When a voltage such as that represented by curve 30 in Fig. 1 is supplied to the left terminal of capacitance 8, the circuit functions as a peak detector. During positive pulses, current flows through the diode and the right side of capacitance 8 gradually assumes a negative potential such that the outflow of current through the diode, during the positive peaks, is just counterbalanced by the inflow through resistance 9 during the remainder of the interval between pulses. The resistance 9 is of such a value that the time constant of resistance 9 and capacitance 8 (i. e., the product of resistance and capacitance), is longer than the interval between successive vertical synchronizing pulses. The result then is to develop, at the output terminal 12, a voltage such as that represented by curve 50 in Fig. 2 in which the peaks of the synchronizing pulses rise higher than the reference voltage provided by the potential on the cathode of diode valve 13 by just the amount necessary to cause diode 13 to conduct sufficient current to insure the proper negative charging of capacitance 8.

If all the synchronizing pulses were of the same duration, the simplified circuit of Fig. 4 would be sufficient to insure that the alternating components of the output are always in proper relation to a unidirectional reference axis. However, as has been explained heretofore, the vertical synchronizing pulses have much longer durations than the horizontal synchronizing pulses. Since the restoring diode has a finite resistance, the charging network, including capacitance 8 and diode 13, has a certain finite time constant. The portion of bias potentiometer 10 included in the network has substantially no effect, since it is bypassed by the relatively large capacitor 14. Therefore capacitance 8 will not charge to the extreme peaks of the synchronizing pulses, but will charge to some value of voltage intermediate between the tops of the blanking pedestals and the peaks of the synchronizing pulses. The value of this voltage will not change appreciably so long as the ratio of the duration of the pulse to the interval between pulses is constant. Accordingly, the value of this voltage will remain constant during the equalization pulses because, whereas the duration of the equalizing pulses is only half that of the horizontal synchronizing pulses, the interval between equalizing pulses is also half that between horizontal synchronizing pulses, and the ratio is unchanged. However, when the vertical synchronizing pulse begins at time $t_3$, this ratio is altered in that the duration of the rectangular pulses is much greater than the duration of the intervals, or slots, between them. For example, in the illustrative curve 30, the duration of the equalizing pulses is .04 H over an interval of .5 H, providing a ratio of 8 to 100, while the duration of the rectangular pulses is .46 H over the same interval, providing a ratio of 92 to 100. Accordingly, the charging current flows for a longer time through the restorer diode and imparts a greater negative charge to capacitance 8, so that the peaks of the vertical synchronizing pulses fall exponentially closer to the voltage existing on the cathode of the restorer valve. This is illustrated again by curve 50 in Fig. 2B in which the vertical synchronizing pulse slopes exponentially down to the restorer cathode voltage reference level represented by line 51. The result, in the output waveform, will be to generate a sawtooth distortion at the frame repetition frequency as illustrated in Fig. 2A. The primary purpose of this invention is to correct for this distortion in the output waveform.

Figure 5:
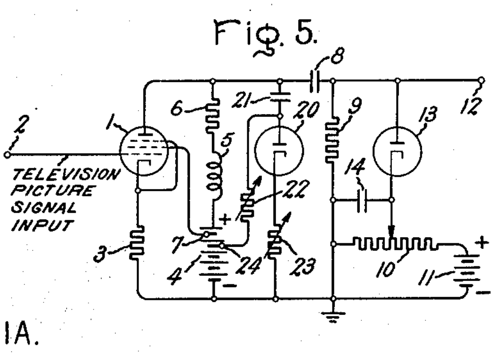
Fig. 5 is a circuit diagram of an improved direct current restorer embodying the invention.

Referring to Fig. 5, there is shown the same amplifier and restorer circuit as shown in Fig. 4 but with the addition of an auxiliary corrective peak detector circuit including a diode 20. The anode of the diode 20 is connected through a capacitance 21 to the intermediate point provided by the anode of pentode valve 1 and its cathode is grounded through an adjustable potentiometer 23. A discharging path is provided by a potentiometer 22, connected from the junction of capacitance 21 and the anode of auxiliary diode 20 to a source of positive bias potential provided by tap 24 on battery 4. The purpose of potentiometer 23 is to control the charging time constant so that, while capacitance 21 will not charge appreciably during the horizontal synchronizing pulses, it will charge during the vertical synchronizing pulses. As a result of the charging of capacitance 21, the absolute magnitude of the current through diode 20 during the vertical synchronizing pulse will decrease, because of the reduction in voltage across diode 20. Since a lesser instantaneous current flows through the auxiliary diode, the impedance which its circuit offers to the anode of valve 1 will be increased. Pentode valve 1 approximates in operation a constant current generator, so that the voltage developed at the junction of capacitances 8 and 21 will be proportional to the sum of the parallel impedances between that point and ground. Accordingly, during the vertical pulse a progressively larger voltage will be developed and applied to the output capacitance 8 and thence to the anode of restorer diode 13.

As soon as the vertical pulse is terminated, at time $t_4$, the average current through the auxiliary diode decreases and capacitance 21 begins to discharge and return to its former voltage level. The load impedance across pentode valve 1 then gradually decreases and the magnitude of the pulses returns to normal.

In practice, capacitance 21 is chosen considerably larger than capacitance 8. Potentiometer 23 is set so that the voltage rise, caused by the charging of capacitance 21, just compensates for the downward displacement of the vertical synchronizing pulse from time $t_3$ to time $t_4$, in Fibs. 2A and 2B. Potentiometer 22 is set so that capacitance 21 discharges at a rate just sufficient to compensate for the upward displacement of the vertical synchronizing pulse from time $t_4$ to time $t_5$, in Figs. 2A and 2B. By proper adjustment of the potentiometers 22 and 23, and also by suitably varying the potential of source 24, the auxiliary detector circuit can be made to correct for different amounts of distortion in one or more uncorrected restorer stages. It will then have a charging and discharging characteristic which eliminates the distortion inherent in the operation of the restorer circuit by introducing a distortion in the opposite sense, and the output at terminal 12 will be as represented by curve 60 in Figs. 3A and 3B. It will be noted that the peaks of the synchronizing pulses, horizontal, equalizing and vertical, now all project above the reference level 51 of the restorer cathode voltage to the same extent, and this is the condition desired.

As an illustration, I have found that the following significant circuit constants provided satisfactory performance in an actual television amplifier embodying the invention and adapted to amplify a standard 525-line, double-interlaced television signal of the form generally represented in Fig. 1B:

- Horizontal sync pulse rate=15,750 C. P. S.
- Vertical sync pulse rate=60 C. P. S.
- Pentode 1: Type 4D32
- Diodes 13 and 20: Two halves of a type 6AL5 tube
- Source 24=300 v.
- Source 11=300 v.
- Capacitor 8=.005 mfd.
- Capacitor 21=.05 mfd.
- Capacitor 14=1 mfd.
- Resistor 9=8.2 megohms
- Resistor 10=0.1-megohm potentiometer
- Resistor 22=2.2-megohm potentiometer
- Resistor 23=47,000-ohm potentiometer It will of course be understood that these values are not limiting, and that other values may be used under different operating conditions and in other embodiments.

For a standard 525 line double-interlaced television signal, the interval H is 63.5 microseconds. The horizontal synchronizing pulses have a time duration 0.08 H, equal to 5.1 microseconds, and the vertical synchronizing pulses have a total time duration 3 H, equal to 190 microseconds or 0.0002 second. An inspection of the circuit constants tabulated above, shows that capacitor 21 is ten times the size of capacitor 8. The time constant of the restorer circuit comprising diode 13 is determined mainly by capacitor 8 and resistor 9 and equals 0.04 second; that of the corrective circuit comprising diode 20 is determined mainly by capacitor 21 and resistor 23 and equals 0.00235 second. Thus the time constant of the restorer circuit is much longer than the time duration of the vertical synchronizing pulses, being in the ratio of 200 to 1, so that no appreciable loading occurs. On the other hand, the time constant of the corrective circuit is much shorter, and is of the order of magnitude of the time duration of the vertical synchronizing pulses, being in the ratio of 11 to 1. Accordingly, capacitor 21 charges appreciably during a single vertical synchronizing pulse, and the current flowing to it decreases, thereby permitting an increase in the current to the restorer circuit and the occurrence of the desired corrective action.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. In a system for amplifying a composite television signal containing high frequency, low frequency, and unidirectional components, said signal including horizontal synchronizing pulses of a fixed amplitude recurring at a relatively high frequency and vertical synchronizing pulses of said fixed amplitude recurring at a relatively low frequency, an amplifier for translating said signal to an intermediate point, said translation being subject to attenuation of said low frequency and unidirectional components, a direct current restorer for reducing said attenuation, said restorer comprising a capacitance and a resistance in series connected between said intermediate point and a common point, and a rectifier connected in parallel with said resistance, the junction of said capacitance with said resistance serving as an output terminal, and a circuit comprising a series combination of a capacitance and a nonlinear resistance connected between said intermediate point and said common point, said combination having a charging time constant substantially less than the time constant of said restorer.

2. In a system for amplifying a composite television signal containing high frequency, low frequency, and unidirectional components, said signal including horizontal synchronizing pulses of a fixed amplitude recurring at a relatively high frequency and vertical synchronizing pulses of said fixed amplitude recurring at a relatively low frequency, an amplifier for translating said signal to an intermediate point, said translation being subject to attenuation of said low frequency and unidirectional components, a peak detector connected between said intermediate point and a common point for restoring said low frequency and unidirectional components by establishing a unidirectional reference level for said composite signal relative to the tips of said synchronizing pulses, and a circuit comprising a series combination of a capacitance and a non-linear resistance connected between said intermediate point and said common point, said combination having a charging time constant of the order of magnitude of the time duration of said vertical synchronizing pulses.

3. In a system for amplifying a composite television signal containing alternating and unidirectional components, said signal including horizontal synchronizing pulses of a fixed amplitude and short time duration and vertical synchronizing pulses of said fixed amplitude and long time duration, an amplifier for amplifying said alternating components, said amplifier operating substantially as a constant current generator in supplying said components to an intermediate point, a direct current restorer, comprising a capacitance and a resistance in series, connected between said intermediate point and a common point, and a rectifier connected in parallel with said resistance, the junction of said capacitance with said resistance serving as an output terminal, said capacitance charging during said synchronizing pulses to establish, at said output terminal, a unidirectional voltage reference level relative to the tips of said synchronizing pulses, and a circuit comprising a series combination of a capacitance and a non-linear resistance connected between said intermediate point and said common point, said latter capacitance being substantially larger than said former capacitance and said combination having a time constant of the order of magnitude of the time duration of said vertical synchronizing pulses and substantially shorter than the time constant of said restorer.

4. In a system for amplifying a composite television signal containing alternating and unidirectional components, said signal including horizontal synchronizing pulses of a fixed amplitude and short time duration and vertical synchronizing pulses of said fixed amplitude and long time duration, an amplifier for amplifying said alternating components, said amplifier operating substantially as a constant current generator in supplying said components to an intermediate point, a direct current restorer, comprising a capacitance and a resistance in series, connected between said intermediate point and a common point, and a rectifier connected in parallel with said resistance, the junction of said capacitance with said resistance serving as an output terminal, said capacitance charging during said synchronizing pulses to establish, at said output terminal, a unidirectional voltage reference level relative to the tips of said synchronizing pulses, said capacitance charging closer to said tips during said vertical than during said horizontal pulses, whereby a distortion is introduced in said reference level, and a corrective circuit comprising a series combination of a capacitance and a non-linear resistance connected between said intermediate point and said common point, said latter capacitance being substantially larger than said former capacitance and said combination having a time constant of the order of magnitude of the time duration of said vertical synchronizing pulses and substantially shorter than the time constant of said restorer, whereby said latter capacitance draws a lesser instantaneous current during said vertical synchronizing pulses to compensate for said distortion.

5. In a system for amplifying a composite television signal containing horizontal and vertical synchronizing pulses both attaining a like maximum value in one polarity, said vertical pulses having a time duration greatly in excess of the time duration of said horizontal pulses, an electronic valve operating as a constant current generator for supplying said signal to an intermediate point, a direct current restorer comprising a capacitance and a resistance in series connected between said intermediate point and a common point, said resistance having a rectifier connected in parallel, the junction of said capacitance with said resistance serving as an output terminal, said rectifier being poled to conduct during said synchronizing pulses to charge said capacitance and establish a unidirectional voltage reference level relative to the tips of said pulses at said output terminal, said capacitance charging closer to said tips during said vertical than during said horizontal pulses as a result of the longer time duration of said vertical pulses, whereby a distortion is introduced in said reference level, and a corrective circuit comprising a capacitance, a rectifier and a resistance serially connected between said intermediate point and said common point, said rectifier being poled to conduct during said pulses, said latter capacitance being substantially larger than said former capacitance and the time constant of said latter capacitance and resistance being substantially less than that of said former capacitance and resistance and of the order of magnitude of the time duration of said vertical synchronizing pulses.

JOHN W. DOWNIE.

REFERENCES CITED

The following references are of record in the file of this patent:

UNITED STATES PATENTS

| Number | Name | Date |
|---|---|---|
| 2,227,001 | Schlesinger | Dec. 31, 1940 |

FOREIGN PATENTS

| Number | Country | Date |
|---|---|---|
| 832,177 | France | Dec. 16, 1936 |